(12) United States Patent
Leto (10) Patent No.: US 9,128,975 B2
(45) Date of Patent: Sep. 8, 2015

(54) SYSTEMS AND METHODS FOR DETERMINING DATA DEPENDENCY FOR DYNAMIC TILES

(71) Applicant: Anthony Leto, Los Gatos, CA (US)

(72) Inventor: Anthony Leto, Los Gatos, CA (US)

( * ) Notice: Subject to any disclaimer, the term of this patent is extended or adjusted under 35 U.S.C. 154(b) by 0 days.

(21) Appl. No.: 13/663,292

(22) Filed: Oct. 29, 2012

(65) Prior Publication Data

US 2014/0122418 A1    May 1, 2014

(51) Int. Cl.
   *G06F 7/00*   (2006.01)
   *G06F 17/30*  (2006.01)

(52) U.S. Cl.
   CPC ................. *G06F 17/30371* (2013.01)

(58) Field of Classification Search
   None
   See application file for complete search history.

(56) References Cited

U.S. PATENT DOCUMENTS

| | | | |
|---|---|---|---|
| 2002/0073064 A1* | 6/2002 | Ahmadi | 707/1 |
| 2007/0203925 A1* | 8/2007 | Sandler et al. | 707/100 |
| 2008/0140636 A1* | 6/2008 | Brodhun et al. | 707/3 |
| 2009/0043790 A1* | 2/2009 | Holster | 707/100 |
| 2011/0207446 A1* | 8/2011 | Iwuchukwu | 455/414.3 |
| 2012/0158762 A1* | 6/2012 | Iwuchukwu | 707/759 |
| 2012/0173339 A1* | 7/2012 | Flynt et al. | 705/14.58 |
| 2012/0254804 A1* | 10/2012 | Sheha et al. | 715/834 |

\* cited by examiner

*Primary Examiner* — Loan T Nguyen (57) ABSTRACT

A system and method to dynamically update a data field are disclosed. In some embodiments, data may be received from a plurality of databases and organized into a plurality of data fields. A first data field may be associated with a single database of the plurality of databases. A user may modify the first data field and the system and method may identify a dependency between the first data field and at least a second data field. The second data field may be updated based on the dependency between the first data field and the second data field.

20 Claims, 9 Drawing Sheets

| Reference ID | Sender | Receiver | Destination | Product | Product Code |
|---|---|---|---|---|---|
| 1 | Company A | Company D 410 | Location A 411 | Product 1 420 | 001 421 |
| 2 | Company B | Company E | Location B | Product 2 | 100 |
| 3 | Company C | Company F | Location C | Product 3 | 111 |

| | Product ID | Product Title | Product Family | Manufac-turer | COO | Description | HTS Code | ECCN Code |
|---|---|---|---|---|---|---|---|---|
| 711 | iTRAC000000003p | Grapple Camera Tripod | Tripod Stand | Grapple Ltd | GB | Retro Kit, 3W 2 Victaulic Masterseal SY2 | 8409.1 | 3289172.1.1.5 |
| 712 | iTRAC000000004p | Pineapple Microphone | Audio Mic | Logitech | BR | Retro Kit, 3W 2 Victaulic Masterseal SY2 | 8409.1 | 3289172.1.1.5 |
| 713 | iTRAC000000017p | G240S+AMB24-3-X1 | Flanged Globe Valve | Lycos | GB | Retro Kit, 3W 2 Victaulic Masterseal SY2 | 8409.1 | 3289172.1.1.5 |

1. Product Identifiers   715

| | |
|---|---|
| Product Title | Grapple Camera Tripod |
| Product SKU Number | 657653726GHS |
| Manufacturer | Grapple Ltd |
| iTrac ID | iTRAC000000003p |

2. Product Parts BOM   720

| ID | HTS |
|---|---|
| 81298317KLL | |
| 81298317KLL | 343234 |

3. Manufacturer Data   730

| | |
|---|---|
| Manufacturer | Grapple Ltd |
| COO of Manufacturer | GB |
| Supplier #1 | ES |
| Supplier #2 | United Kingdom |

4. Dimensions   735

| | |
|---|---|
| United of Measurement | United States |
| Main Unit Shipping Weight | KG |
| Volumetric Unit Shipping Weight | 0.5KG |
| Length | 120KG |
| Width | 15cm |
| Height | 35mm |

5. HTS Codes   740

| | |
|---|---|
| United States | 6403.59 |
| Germany, Federal Republic | 8473.3 |
| Austria | 213123121 |

6. ECCN Codes   745

| | |
|---|---|
| Nepal | 3289172.1.1.5 |
| Nepal | 3289172.1.1.5 |
| Zambia | 565.985.6 |

7. Pricing Information   750

| Price Title | Price Description | Amount | Currency |
|---|---|---|---|
| SS Europe Price | Main Unit Standard | 109 | GTQ |
| 20cm | US Locale price | main price for US | 199 |

10. Export Licenses   770

| Country | License Title | License ID/Code | Document |
|---|---|---|---|
| United States | 1234 | US | Realex-MagentoExtension- |

9. Import Licenses   740

| Country | License Title | License ID/Code | Document |
|---|---|---|---|
| United States | 12345 | 12345 | Postgraduate Application Form |
| Germany | | | Postgraduate Application Form |

SYSTEMS AND METHODS FOR DETERMINING DATA DEPENDENCY FOR DYNAMIC TILES

FIELD

The present disclosure relates to systems and methods for data dependency. In some embodiments, the present disclosure relates to systems and methods for determining data dependency for dynamic tiles.

BACKGROUND

Conventional user interfaces for a user platform (e.g., an application program) using a database or an aggregate of databases are typically static. The conventional user platform may receive data from one or more external databases. For example, the conventional user platform may query a plurality of databases and organize data from the queried databases into the database of the user platform. As such, the user interface of the conventional user platform may display data fields comprising information or data queried from a plurality of databases.

Conventional user platforms do not dynamically respond to a change to a data field. As such, conventional user platforms tend to be static. For example, if a user changes a data field in a user interface of the user platform, then other data fields associated with the changed data field may be out of date or incorrect.

As such, it is desirable to develop systems and methods of systems and methods for implementing a dynamic data platform associated with a plurality of databases. For example, systems and methods for determining data dependency for dynamic tiles may address such functionality.

SUMMARY

The present disclosure introduces systems and methods for determining data dependency for dynamic tiles.

The systems or methods may receive data from a plurality of databases. The received data may be organized into a plurality of data fields. In some embodiments, a first data field is associated with a single database of the plurality of databases. The system or method may further receive a modification to the first data field of the plurality of data fields and identify a dependency between the first data field and other data fields of the plurality of data fields. Furthermore, the systems or methods may update a second data field of the plurality of data fields based on the dependency between the first data field and the other data fields. In some embodiments, the second data field is updated if the second data field is dependent upon the first data field.

In some embodiments, the dependency between the first data field and the other data fields of the plurality of data fields comprises an indication that a modification to the first data field requires an updating of at least one data field of the other data fields.

In some embodiments, the systems or methods may further display a plurality of dynamic tiles based on a user selection of a first entry. In the same or alternative embodiments, a first dynamic tile comprises at least one of the data fields and is associated with a first query. The systems or methods may further receive a user selection of a second entry and execute the first query associated with the first dynamic tile in response to the user selection.

In some embodiments, the execution of the first query is performed without a user input of query keywords. The systems or methods may further display the first dynamic tile with at least one updated data field in response to the execution of the first query. In some embodiments, the at least one updated data field is at least partly based on the user selection of the second entry In some embodiments, the first data field is associated with a first database and the second data field is associated with a second database, the updating of the second data field results in the querying of the second database based on the modification of the first data field.

In some embodiments, the first database and the second database are independent of each other such that the first database and the second database are associated with different locations and different administrators.

In some embodiments, the systems or methods are to facilitate an import or export compliance environment.

BRIEF DESCRIPTION OF THE DRAWINGS

The novel features of the disclosure are set forth in the appended claims. However, for purpose of explanation, several embodiments of the disclosure are set forth in the following figures.

FIG. 7 depicts an example user interface comprising dynamic tiles in accordance with some embodiments.

DETAILED DESCRIPTION

The systems and methods disclosed herein relate to determining data dependency for dynamic tiles.

In the following detailed description, numerous specific details are set forth in order to provide a thorough understanding of the present disclosure. However, it will become obvious to those skilled in the art that the present disclosure may be practiced without these specific details. The description and representation herein are the common means used by those experienced or skilled in the art to most effectively convey the substance of their work to others skilled in the art. In other instances, well known methods, procedures, and systems have not been described in detail to avoid unnecessarily obscuring aspects of the present disclosure.

Figure 1:
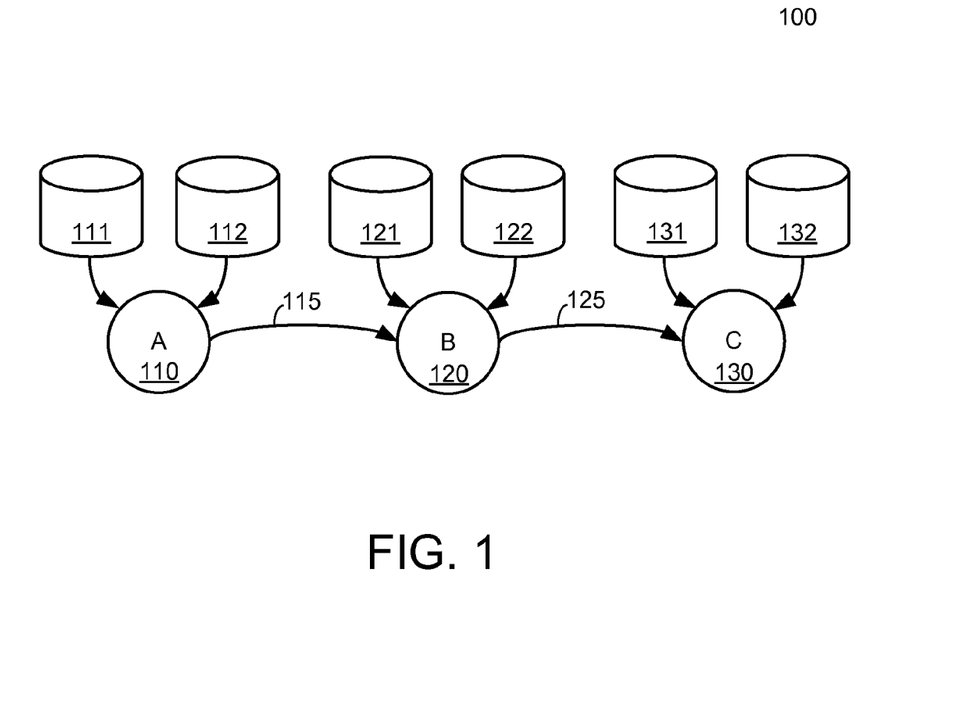
FIG. 1 is a block diagram of an example import and export compliance environment in accordance with some embodiments.

FIG. 1 is a block diagram of an example import and export compliance environment 100 in accordance with some embodiments. In general, the environment 100 may comprise a plurality of locations and a plurality of transactions associated with the trade of products between a plurality of entities.

As shown in FIG. 1, the environment 100 may comprise locations 110, 120, and 130. Each of the locations may correspond to the source or destination associated with the shipment and/or receiving of a product. For example, the location 110 may be associated with the origination or source of a product and a transaction 115 may comprise the shipment of the product from the location 110 to the location 120. As such, the location 120 may comprise the destination associated with the transaction 115. In some embodiments, the transaction 115 may be associated with one or more entities. For example, the transaction 115 may be associated with a vendor (e.g., a supplier or manufacturer of the product), broker, customer, etc. As such, a vendor of the product at the location 110 may ship a product to a broker at the location 120 as the transaction 115. In some embodiments, the location 120 may also be the source for a transaction 125. For example, an entity associated with the destination of transaction 115 may further ship the product to another entity at a location 130. As such, the transaction of a product from the location 110 to a final destination at location 130 may comprise a plurality of transactions (e.g., sub-transactions) 115 and 125 and a plurality of entities (e.g., a shipper at location 110, a receiver and shipper at location 120, a receiver at location 130, etc.).

In some embodiments, each of the transactions 115 and 125 to ship a product from the location 110 to the location 130 may require import and/or export compliance information. For example, information regarding the product being shipped, shipping information, customs information, and other import and export compliance information may need to be kept and/or sent to other entities. Furthermore, in some embodiments, each of the locations 110, 120, and 130 may be associated with a plurality of databases. For example, location 110 may be associated with databases 111 and 112, location 120 may be associated with databases 121 and 122, and location 130 may be associated with databases 131 and 132. In some embodiments, the databases may correspond to location specific information. For example, a database may comprise Harmonized Tariff Schedule (HTS) codes for a particular country, product catalog information of a shipper or receiver, or any other database comprising information necessary for completing a transaction.

As is evident from the above discussion, a transaction of a product may be associated with a plurality of sub-transactions, entities, locations, and databases. Organizing such information and facilitating access to the information for entities in the transaction chain of the environment 100 may require a coordinated and complicated workflow. Systems and methods to facilitate the workflow of the environment 100 are discussed in further detail below. For example, a user platform that determines data dependencies for dynamic tiles may address the above issues. Furthermore, the user platform may aggregate data from widely dispersed and independent sources (e.g., databases 111, 112, 121, 122, 131, and 132) to facilitate a highly distributed transactional-based workflow management.

Figure 2:
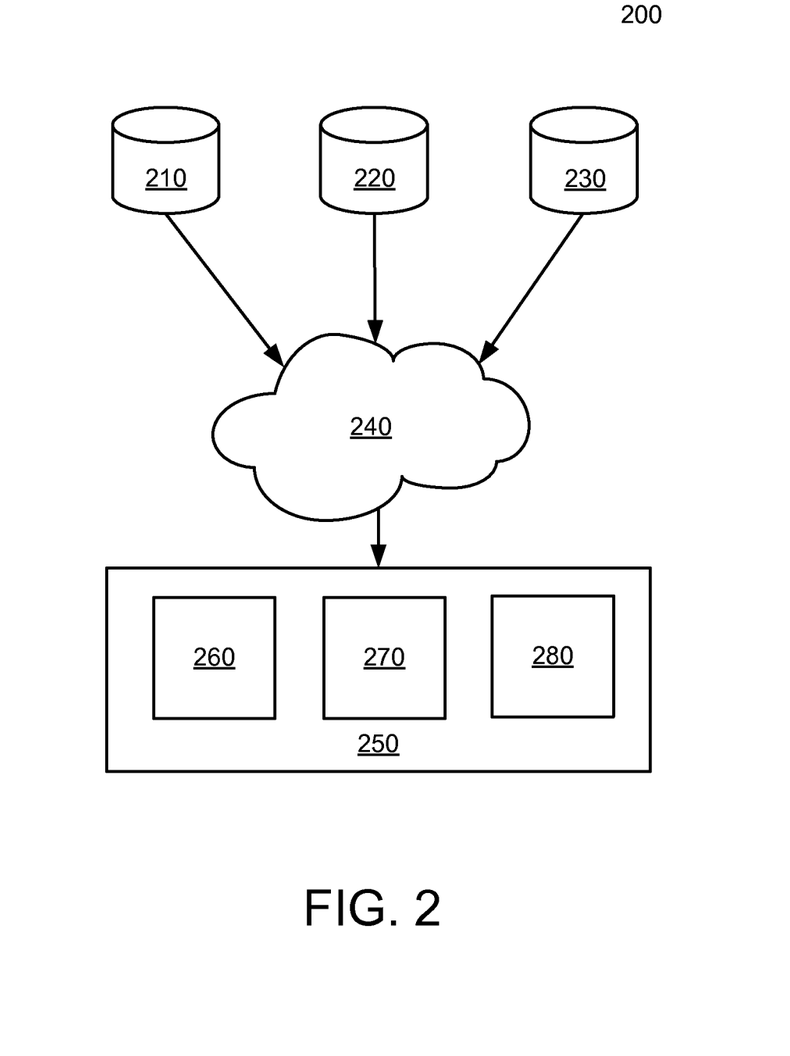
FIG. 2 is a block diagram of an example environment for a system and/or method for determining data dependency for dynamic tiles.

FIG. 2 is a block diagram of an example environment 200 for a system and/or a method for determining data dependency for dynamic tiles. In general, the environment 200 may comprise a user interface for organizing and displaying data from one or more databases.

As shown in FIG. 2, the environment 200 may comprise a plurality of databases (e.g., database 210, database 220, and database 230). In some embodiments, each of the databases 210, 220, and/or 230 may be independent of each other. For example, each of the databases 210, 220, and/or 230 may be associated with a separate administrative entity and/or a different location. In some embodiments, each of the locations may be associated with a different firewall and/or network. For example, each of the databases 210, 220, and/or 230 may be on a separate network and behind a separate firewall. The databases 210, 220, and/or 230 may further be based on and/or operated by different platforms (e.g., software applications, software operating systems, etc.). Thus, each of the databases 210, 220, and/or 230 may be associated with a different entity at different locations (e.g., network locations) where each of the locations comprises a different firewall and a different platform for operating the databases 210, 220, and/or 230. In some embodiments, the entities associated with the databases 210, 220, and/or 230 may not access each of the other databases. For example, each of the databases 210, 220, and/or 230 may operate without knowing of or connecting with any of the other databases 210, 220, and/or 230. As such, each database of the environment 200 may be considered independent of each of the other databases of the environment 200 and the databases may further be considered widely dispersed databases. For example, database 210 may be a database associated with a governmental entity, database 220 may be a database associated with an enterprise software systems of a first corporation, and database 230 may be a database associated with an enterprise software systems of a second corporation. In some embodiments, a network 240 (e.g., the Internet) may communicatively couple each of the databases 210, 220, and 230 to a user platform 250. In some embodiments, the user platform 250 may comprise data groups 260, 270, and 280. The user platform 250 may query one or more of the databases 210, 220, and/or 230 to request data from the one or more databases. For example, the user platform 250 may transmit a query to receive data from each of the databases 210, 220, and 230 over the network 240. In response, each of the databases 210, 220, and 230 may transmit data associated with the query from the user platform 250 over the network 240 to the user platform 250. In some embodiments, the user platform 250 may organize or structure the data received from the databases 210, 220, and 230. For example, the user platform 250 may place the received data from database 210 into the data group 260, the received data from database 220 into the data group 270, and the received data from the database 230 into the data group 280. As such, the user platform 250 may be aware of where a specific received and stored data originates from among the databases 210, 220, and 230. In some embodiments, the data from the databases 210, 220, and 230 may be organized by the user platform 250 into dynamic tiles. Furthermore, data dependencies from the received data from the database 210, 220, and 230 may be identified. Further details with regard to such organization of data into dynamic tiles and identification of data dependencies are discussed in further detail below.

Figure 3:
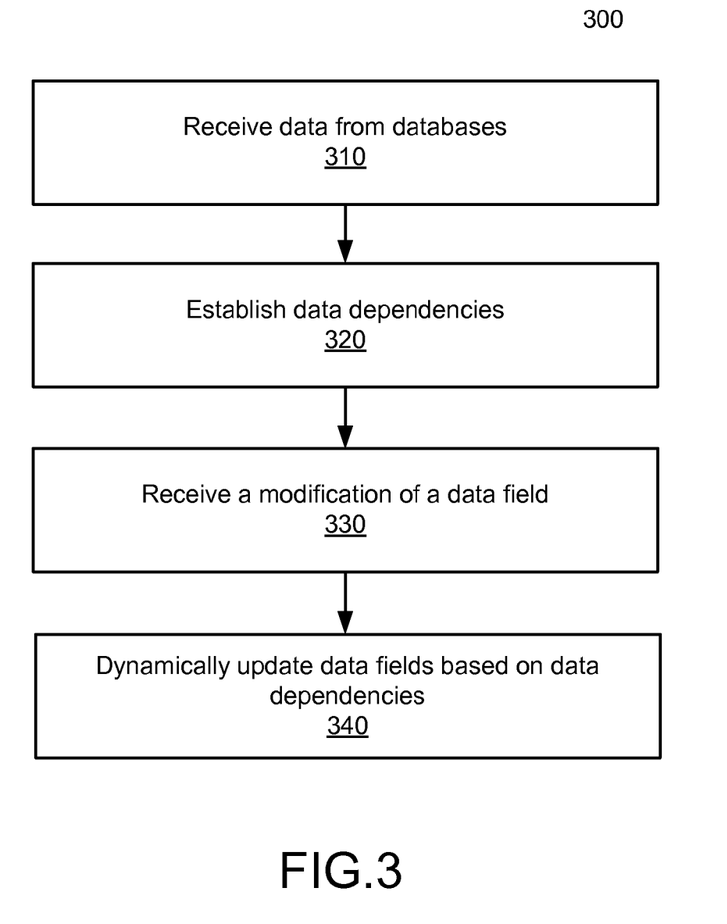
FIG. 3 is a flow diagram of an example method for determining data dependency for dynamic tiles in accordance with some embodiments.

FIG. 3 is a flow diagram of an example method 300 for determining data dependencies for dynamic tiles in accordance with some embodiments. In general, the method 300 may update a data field in response to a modification of a data field by using data dependencies associated with the modified data field.

As shown in FIG. 3, at step 310, the method 300 may receive data from one or more databases. For example, a user platform (e.g., user platform 250) may request data from one or more databases (e.g., databases 210, 220, and/or 230) and receive the requested data over a network (e.g., network 240). Next, at step 320, data dependencies may be determined or identified. For example, a user platform (e.g., user platform 250) may determine or identify data dependencies from the data received from the one or more databases. In some embodiments, data dependency may correspond to a first data needing to be updated or a database from which the data originates needing to be queried in response to a modification of a second data. As such, the user platform may identify whether all or a portion of the data received from a first database (e.g., database 210) is dependent upon data received from a second database (e.g., database 220) or a third database (e.g., database 230). Further details with regard to data dependency are discussed in further detail below.

As shown in FIG. 3, at step 330, a change or modification of a data field may be received. For example, a user platform (e.g., user platform 250) may receive a notification that a data field has been modified. In some embodiments, the modification of the data field may be from a user utilizing a user interface of the user platform or from a change to data stored on the database 210, 220, and/or 230. For example, a user may manually modify a data field by utilizing the user interface of the user platform or an administrator or other user of the database 210, 220, and/or 230 may modify data stored on the database and the user platform may receive a notification or identify that such data has been modified (e.g., after querying the database). In some embodiments, a modification to a data field may result in the user platform to verify or check data fields that are dependent upon the modified data field. At step 340, data fields may be dynamically updated based on the data dependencies. For example, a user platform (e.g., user platform 250) may update data fields in response to a modified data field. In some embodiments, the updated data fields correspond to dependent data fields of the modified data field.

As such, data from one or more databases may be received. In some embodiments, the data may be organized into dynamic tiles, as further discussed below. In the same or alternative embodiments, the data may be displayed in data fields. Data dependencies between data fields may be determined. In some embodiments, a modification to a data field may result in the dynamic updating of a second data field if the second data field is dependent upon the modified data field.

Figure 4:
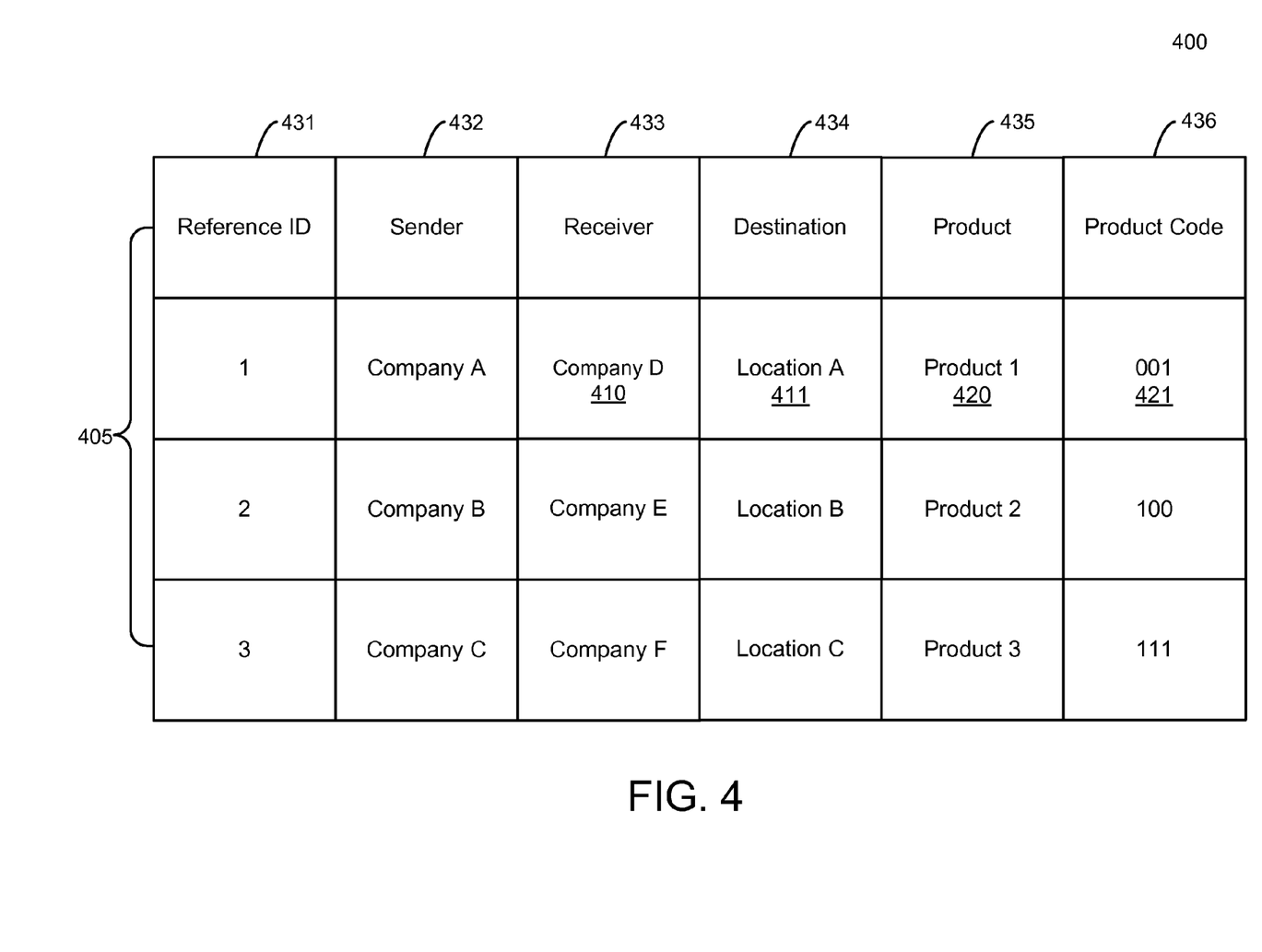
FIG. 4 depicts an example data table comprising data fields in accordance with some embodiments of the present disclosure.

FIG. 4 depicts an example data table 400 comprising data fields in accordance with some embodiments of the present disclosure. In general, the data table 400 may comprise a plurality of entries, each entry comprising a plurality of data fields. In some embodiments, a user platform (e.g., user platform 250) may comprise or use the data table 400.

As shown in FIG. 4, the data table 400 may comprise a plurality of data entries 405. In some embodiments, each of the data entries 405 may further comprise data fields corresponding to a plurality of types of data. For example, each data entry 405 may comprise data corresponding to data columns 431, 432, 433, 434, 435, and 436. In some embodiments, each of the data entries 405 may correspond to an item relating to import and/or export compliance. However, the example as shown in FIG. 4 is merely for exemplary purposes and is not intended to be limited to the data or types of data as show with regard to data columns 431, 432, 433, 434, 435, and/or 436. Furthermore, the example as shown in FIG. 4 is not intended to be limited to import and/or export compliance workflows as such an example is for illustrative purposes. As such, a data table comprising data entries, some of which may be data dependent, may be used for other types of workflows outside of the scope or use of import and/or export compliance.

As shown in FIG. 4, the data column 431 may comprise data identifying a data entry reference identification, data column 432 may comprise data corresponding to a sender, data column 432 may comprise data corresponding to a receiver, data column 434 may comprise data corresponding to a destination, data column 435 may comprise data corresponding to a product, and data column 436 may comprise data corresponding to a product code. As such, the data table 400 comprises a plurality of entries where each of the entries comprises a plurality of data fields. In some embodiments, a user platform (e.g., user platform 250) may organize data received from a plurality of databases (e.g., databases 210, 220, and/or 230) into the data table 400. For example, the data columns 432, 433, 434, and/or 435 may be associated with a first database (e.g., data received from database 210) and the data column 436 may be associated with a second database (e.g., data received from database 220). As such, the data table 400 may represent data received from a plurality of databases. In some embodiments, the user platform may determine data dependencies of the data fields of the data table 400. For example, the user platform may determine that the data fields from data column 432 and the data fields from the data column 433 are not dependent upon each other. For example, the user platform may determine that the data field 410 and the data field 411 are independent of each other such that a change or modification of the data field 410 does not need to result in the updating or querying with respect to data field 411. In the same or alternative embodiments, the user platform may determine that the data fields from the data column 435 and the data fields from the data column 436 are dependent upon each other. For example, the user platform may determine that data field 420 and data field 421 are dependent upon each other. In some embodiments, the dependency of data fields may be that if one of the data fields has been modified, then the modification may necessitate the updating and/or querying of information of the second (e.g., not modified) data field. For example, as illustrated, a change of a product from the data field 420 may result in the change of a product code from data field 436. As such, if a user or system modifies the data field 420, then the data field 421 may automatically be updated in response to the modification of the data field 420.

Figure 5:
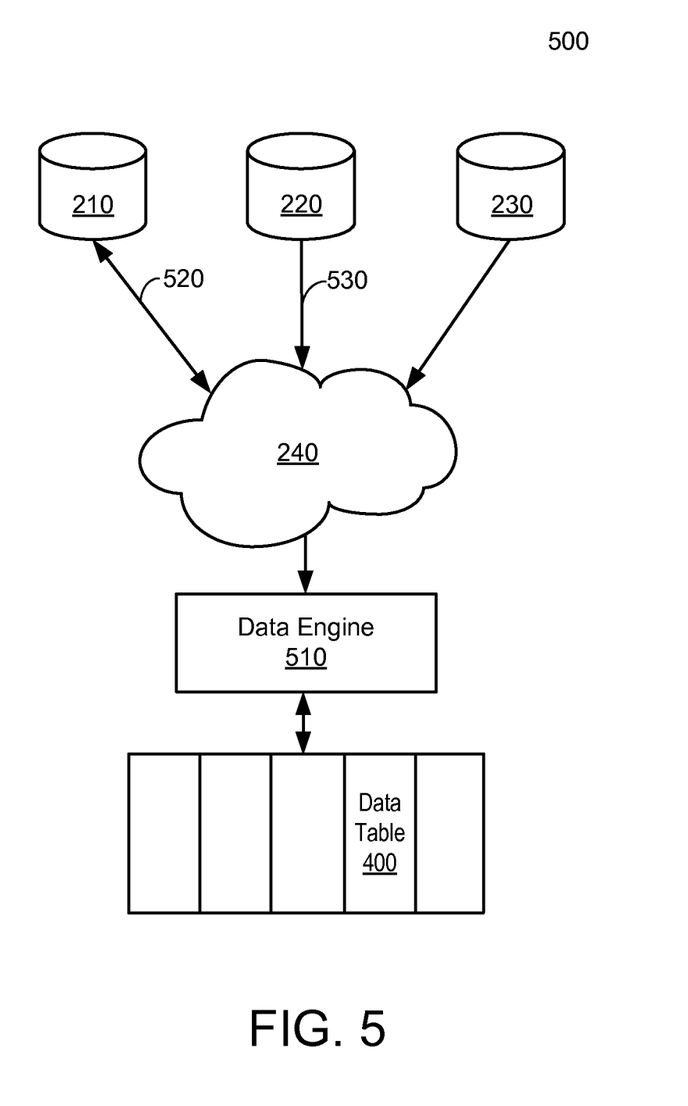
FIG. 5 is a block diagram of an example environment using a data engine for determining data dependence for dynamic tiles.

FIG. 5 is a block diagram of an example environment 500 using a data engine for determining data dependencies for dynamic tiles. In general, the data engine of the environment 500 may determine and dynamically manage data fields based on data dependencies between the data fields.

As shown in FIG. 5, the environment 500 may comprise a plurality of databases. For example, the environment 500 may comprise a database 210, database 220, and database 230. In some embodiments, each of the databases may be independent. For example, each database may be administered by a separate entity. Furthermore, the database 210, database 220, and database 230 may be communicatively coupled to a data engine 510 by a network 240. In some embodiments, a user platform (e.g., user platform 250) may comprise the data engine 510. In the same or alternative embodiments, the data engine 510 may determine or identify data dependencies from data received from the database 210, database 220, and database 230. For example, the data engine 510 may receive an input from a user that some portion or all of the data from a first database may be associated with or dependent upon another portion or all of the data from a second database. In the same or alternative embodiments, the data engine 510 may further retrieve data from the databases 210, 220, and 230. For example, the databases may transmit data to the data engine 510 (e.g., as illustrated from path 530). The data engine 510 may then organize the received data from the databases 210, 220, and 230 (e.g., based on a schema using table 400). For example, the data engine 510 may organize the received data into a plurality of data fields. In some embodiments, each of the data fields may comprise data received from a single database 210, 220, or 230. As such, the data engine 510 may indicate dependency between the data fields. For example, the data engine 510 may indicate data dependencies of the data fields of the data table 400 and dynamically update the data fields of the data table 400 based on the data dependencies when a data field is modified.

In some embodiments, the data engine 510 may be associated with permission (e.g., access or update permission) to update one or more of the databases 210, 220, and 230. For example, the path 520 may be associated with transmitting data from the database 210 to the data engine 510, where the data may populate at least one of the data fields of the data table 400. In some embodiments, the data engine may modify (e.g., in response to a user input) one of the data fields where the data from the database 210 has been populated. As such, the data engine 510 may transmit the data from the modified data field to the database 210 so that the database 210 may be updated to reflect the modified data.

Figure 6:
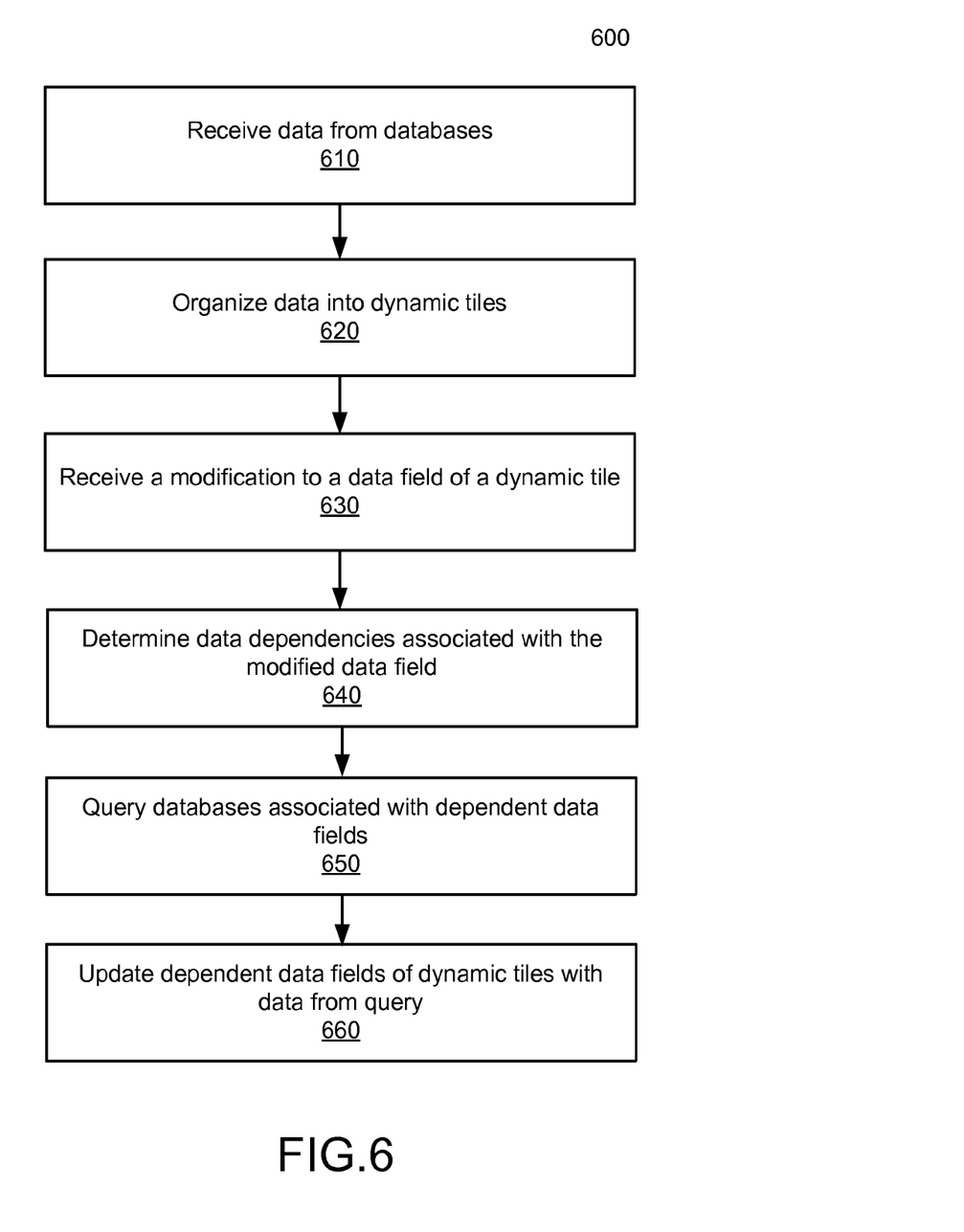
FIG. 6 is a flow diagram illustrating an example method for using data dependencies to query one or more databases in response to a change of a data field in accordance with some embodiments.

FIG. 6 is a flow diagram illustrating an example method 600 for using data dependencies to query one or more databases in response to a change of a data field in accordance with some embodiments. In general, the method 600 may be used to dynamically update one or more data fields in response to a modification of another data field. In some embodiments, a data engine (e.g., data engine 510) may perform one or more of the steps of the method 600.

As shown in FIG. 6, the method 600 may receive, at step 610, data from one or more databases. For example, the data engine may receive data from a plurality of databases (e.g., database 210, 220, and/or 230). At step 620, the receive data may be organized into data fields in dynamic tiles. For example, the data may be organized into a plurality of data fields where each data field is associated with data from a single database. Further details with regard to the organization of the data into dynamic tiles are further discussed below in association with FIG. 7. At step 630, a modification to a data field may be received. For example, a modification or change to a data field of a dynamic tile may be received from a user. Furthermore, at step 640, data fields that are dependent upon the modified data field may be identified. For example, a data engine (e.g., data engine 510) may identify or have previously identified or received information to indicate which data fields are dependent with other data fields. As such, the data engine may determine or identify the data fields that are dependent upon the data field that has been modified. Thus, the specific one or more data fields from a plurality of data fields that are associated or dependent upon the modified data field are identified. At step 650, databases that are associated with the dependent data fields (e.g., data fields that are dependent or associated with the modified data field) may be queried. For example, databases (e.g., databases 210, 220, and/or 230) may be queried if a data field is populated with data originally from the database (e.g., data transmitted from the database to the data engine and/or user platform in response to a query). In some embodiments, each data field may be associated with a single database. As such, if a plurality of data fields is dependent or associated with the modified data field, then a plurality of databases may be queried in response to the modification of the data field. For example, in some embodiments, a first data field may be modified. In the same or alternative embodiments, the first data field may be associated with a second data field and a third data field. In some embodiments, the modification of the first data field may necessitate the updating of data of the second data field and the third data field (e.g., the second data field and the third data field are dependent upon the first data field). Furthermore, the second data field may be associated with a first database (e.g., the second data field was originally populated with data retrieved from the first database) and the third data field may be associated with a second database (e.g., the third data field was originally populated with data retrieved from the second database). As such, in order to update the second data field and the third data field in response to the modification of the first data field, the first database and the second database may need to be queried. For example, the first database may be queried to retrieve new data for the second data field and the second database may be queried to retrieve new data for the third data field. In some embodiments, the querying of the first database and the second database may be based on the modification of the first data field and/or the type of data comprised within the second data field and/or third data field. For example, in some embodiments, a product field may comprise an identification of a first product. If the product data field is changed or modified (e.g., a user changes the product data field to indicate a second product instead of the first product), then dependent data fields, such as a product code data field and a product supplier data field, may be need to be updated in response to the modification of the product data field from an identification of the first product to an identification of the second product as the product code and the product supplier for the second product may differ from the product code and the product supplier of the first product. In some embodiments, the product code data field may be associated with a product code database and the product supplier data field may be associated with a product supplier database. In the same or alternative embodiments, each of the product code database and the product supplier database may be administered by distinct or separate entities. For example, each of the product code database and the product supplier database may be associated with a different administrator, be associated with different permissions, and comprise different locations (e.g., network locations). As such, in response to the modifying of the product data field, a plurality of databases may be queried. Furthermore, the querying of each of the databases may be dependent upon the modification of the product data field and the dependent data field. For example, the query for the product code database may request a new product code for the second product (e.g., as indicated in the product data field) and a query for the product supplier database may request a new product supplier for the second product. Moreover, at step 660, the method 600 may update the dependent data fields of dynamic tiles with the data received from the query of step 650. For example, dependent data fields may be updated to reflect the change of a modified data field.

FIG. 7 depicts an example user interface 700 comprising dynamic tiles in accordance with some embodiments. In general, the user interface 700 may comprise a plurality of dynamic tiles for displaying information from a plurality of disparate sources (e.g., databases 210, 220, and/or 230) and information from a plurality of entities to facilitate a transaction (e.g., transactions 115 and 125). Furthermore, the user interface 700 may comprise an online application (including data engine 510) that runs within a web browser and capable of being accessed over a network (e.g., network 240) by one or more entities or users.

As shown in FIG. 7, the user interface 700 may comprise a selection tile 710 allowing a user (e.g., an entity as previously discussed) to select one or more products. For example, the selection tile 710 may comprise entries 711, 712, and 713. In the example provided, the user interface 700 corresponds to a selection of a product. However, the user interface 700 may be used for other purposes and the example of a product and product information is merely provided as an example. In some embodiments, each of the entries 711, 712, and 713 corresponds to a single product. For example, entry 711 is a 'Grapple Camera Tripod.' The entry 711 displays a plurality of entry fields comprising information relating to the product. Furthermore, in some embodiments, the selection of the entry 711 enables the display of a plurality of dynamic tiles. For example, if a user clicks on the entry 711, the user interface 700 may display dynamic tiles 715, 720, 730, 735, 740, 745, 750, 760, and/or 770. In some embodiments, each of the dynamic tiles comprises one or more data fields that display information from one or more databases. As such, the organization of data from widely dispersed databases, as previously discussed, may be based on the use of the dynamic tiles of the user interface 700. In some embodiments, the dynamic tile 715 may comprise product identifier data fields (e.g., product title, product SKU number, product family, manufacturer, product description, user platform identification), the dynamic tile 720 may comprise product parts data fields, the dynamic tile 730 may comprise manufacturer data fields (e.g., identification of the manufacturer, country of origin, suppliers of the product), and the dynamic tile 735 may comprise data fields regarding the dimensions (e.g., unit of measurement, shipping weight, length, width, height, etc.) of the product (e.g., the 'Grapple Camera Tripod'). In some embodiments, a dynamic tile 740 may comprise HTS codes for a plurality of countries for the product, the dynamic tile 745 may comprise data fields for Export Control Classification Number (ECCN) codes for one or more countries, dynamic tile 750 may comprise data fields for pricing information, dynamic tile 760 may comprise data fields for import licenses associated with the product, and dynamic tile 770 may comprise data fields for export licenses associated with the product. Although specific types of dynamic tiles are disclosed above, any type of information may be organized into the data fields of the dynamic tiles.

In some embodiments, the selection of a different entry (e.g., entry 712 and/or 713) may result in the dynamic changing of the dynamic tiles. For example, if a user has selected entry 711, the dynamic tiles may display data fields associated with the product of entry 711. However, if the user clicks on the entry 712, the dynamic tiles may automatically update to reflect the data fields associated with the product of entry 712. In some embodiments, the updating may be performed on the same page without any reloading. For example, the clicking on the entries 711, 712, or 713 may be enabled such that a webpage comprising the user interface 700 does not reload in response to each click of an entry. Instead, the dynamic tiles may be updated immediately on the user interface on the webpage without reloading the webpage. Furthermore, the clicking from one entry to another in the user interface 700 may result in the dynamic querying of one or more databases. For example, if a user clicks on entry 711, a plurality of databases may be queried for information regarding the product of the entry 711. Received information may be organized into the data fields of the dynamic tiles. Next, if a user clicks on the entry 713, the plurality of databases may be queried again for information regarding the product of the entry 713. The new information regarding the product of the entry 713 may also be organized into the data fields of the dynamic tiles.

Furthermore, a user may update or modify the dynamic tiles. For example, the user may modify a data field of the dynamic tiles of the user interface 700. In some embodiments, the modification of one of the data fields of a dynamic tile of the user interface 700 may be associated with the method 300 of FIG. 3 and the method 600 of FIG. 6.

In some embodiments, the dynamic tiles as shown in FIG. 7 may each display a portion of a database associated with the user interface 700. For example, each of the dynamic tiles of the user interface 700 may display one or more data fields that have been received and organized from a plurality of databases (e.g., database 210, 220, and/or 230 as disclosed with relation to step 620 of FIG. 6, etc.). In some embodiments, each of the dynamic tiles may be associated with a query. For example, the dynamic tile 715 may be associated with a first query for the database associated with the user interface 700 and the dynamic tile 720 may be associated with a second query for the database associated with the user interface 700. In some embodiments, the queries for each of the dynamic tiles are a query for the data associated with the data fields of the dynamic tiles. For example, the query for dynamic tile 715 may request data associated with data fields for the product title, product SKU number, manufacturer, and user platform ID and the query for dynamic tile 720 may request data associated with the data field for HTS codes. In some embodiments, the queries for the dynamic tiles are executed or run whenever a data field of the user interface 700 (e.g., a data field displayed by a dynamic tile) is modified or a selection is made (e.g., a selection of entry 711, 712, and/or 713) in the user interface 700. As such, the dynamic tiles may respond to any change or input to the user interface 700. In some embodiments, the dynamic tiles may automatically update (e.g., reflect new data in the data fields) without refreshing a webpage comprising the user interface 700.

As such, an application program (e.g., an Internet application executing the user interface 700 on a webpage) may determine data dependency for dynamic tiles. In some embodiments, the data dependency of data fields may result in the execution of queries to external (e.g., widely dispersed) databases in response to a modification of a data field. Furthermore, the dynamic tiles may each be associated with a view of particular data of a database comprising organized information from a plurality of external databases. In some embodiments, the dynamic tiles may execute a query to the database in response to a change or user selection of a data field or entry of the user interface 700. As such, a user does not have to input a query as the dynamic tiles may automatically execute a query in response to the change of a data field or the user selection of an entry.

The above disclosure may facilitate a plurality of transactional-based environments. For example, although the above disclosure generally relates to import and export compliance, the user interfaces, methods, and systems may also be used to facilitate other such transactional-based workflows such as a healthcare workflow (e.g., a plurality of doctors and an insurance adjuster facilitating a transaction involving a patient).

Figure 8:
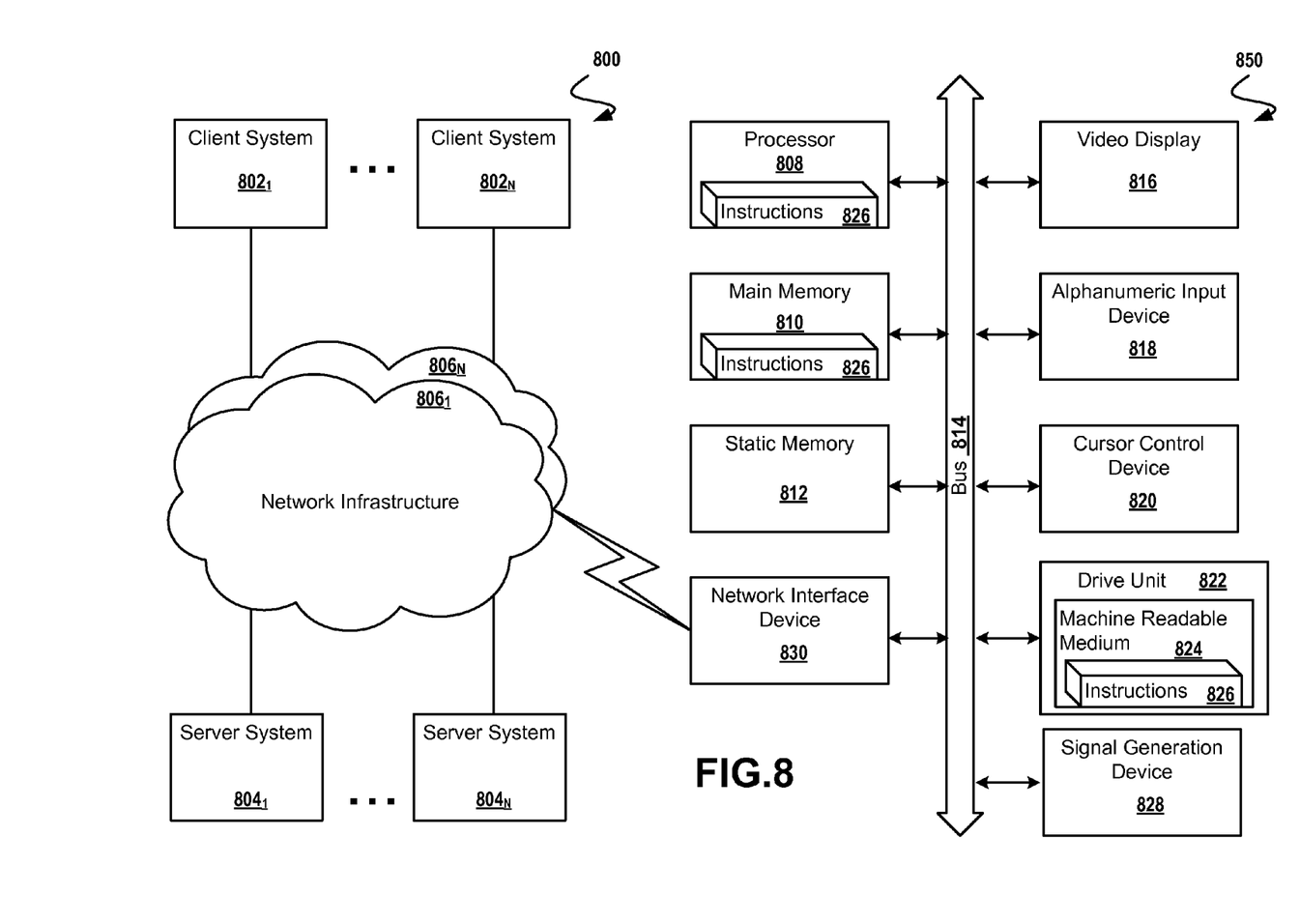
FIG. 8 depicts a diagram illustrating an exemplary computing system for execution of the operations comprising various embodiments of the disclosure.

FIG. 8 depicts a diagram illustrating a network 800 for execution of the operations comprising various embodiments of the disclosure. The diagrammatic representation of the network 800, including nodes for client computer systems $802_1$ through $802_N$, nodes for server computer systems $804_1$ through $804_N$, nodes for network infrastructure $806_1$ through $806_N$, any of which nodes may comprise a machine 850 within which a set of instructions for causing the machine to perform any one of the techniques discussed above may be executed. The embodiment shown is purely exemplary, and might be implemented in the context of one or more of the figures herein.

Any node of the network 800 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 850 includes a processor 808 (e.g. a processor core, a microprocessor, a computing device, etc.), a main memory 810 and a static memory 812, which communicate with each other via a bus 814. The machine 850 may further include a display unit 816 that may comprise a touchscreen, or a liquid crystal display (LCD), or a light emitting diode (LED) display, or a cathode ray tube (CRT). As shown, the computer system 850 also includes a human input/output (I/O) device 818 (e.g., a keyboard, an alphanumeric keypad, etc.), a pointing device 820 (e.g., a mouse, a touch screen, etc.), a drive unit 822 (e.g. a disk drive unit, a CD/DVD drive, a tangible computer readable removable media drive, an SSD storage device, etc.), a signal generation device 828 (e.g. a speaker, an audio output, etc.), and a network interface device 830 (e.g. an Ethernet interface, a wired network interface, a wireless network interface, a propagated signal interface, etc.).

The drive unit 822 includes a machine-readable medium 824 on which is stored a set of instructions (i.e. software, firmware, middleware, etc.) 826 embodying any one, or all, of the methodologies described above. The set of instructions 826 is also shown to reside, completely or at least partially, within the main memory 810 and/or within the processor 808. The set of instructions 826 may further be transmitted or received via the network interface device 830 over the network bus 814.

It is to be understood that embodiments of this disclosure may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Figure 9:
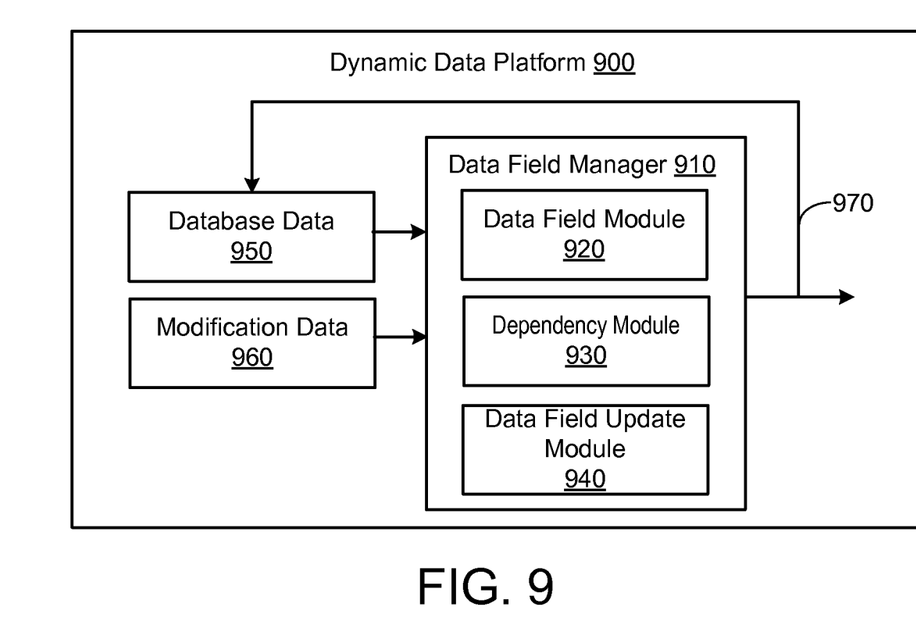
FIG. 9 depicts an example dynamic data platform system for determining data dependency of dynamic tiles.

FIG. 9 depicts an example dynamic data platform system 900 for determining data dependency of dynamic tiles. In general, the dynamic data platform system 900 may comprise a data field manager 910 for performing the methods associated with determining data dependency as disclosed herein.

As shown in FIG. 9, the data field manager 910 may comprise a data fields module 920, dependency module 930, and a data field update module 940. In some embodiments, the data field manager 910 may receive database data 950 and modification data 960. For example, the database data 950 may be information from one or more databases that has been organized into dynamic tiles as previously discussed. Furthermore, the modification data 960 may comprise a change to the database data 950 after it has been received by the data field manager 910. In some embodiments, the data fields module 920 may store the database data 950 and the dependency module 930 may determine the dependencies between the data fields of the data fields module 920. Furthermore, the data field update module 940 may request an update to data from a database in response to the modification data 960. For example, the data field update module 940 may issue an output request 970 to one or more databases in response to the modification data 960.

What is claimed is:

1. A method to display data, the method comprising:
displaying, using at least one computer, as a first component of a user interface, a selection tile comprising a plurality of entries such that each entry is associated with a data set;
organizing, using the computer, for each entry, a plurality of dynamic tiles to display data associated with a corresponding data set of an entry, wherein each dynamic tile comprises one or more data fields of the data set;
receiving, using the computer, a first selection of a first entry displayed in the selection tile;
receiving, using the computer, data associated with the data set for the first entry;
displaying, using the computer, as a second component of the user interface, the received data within the data fields of the dynamic tiles associated with the first entry;
receiving, using the computer, a second selection of a second entry displayed in the selection tile;
receiving, using the computer, data associated with the data set for the second entry; and
displaying, using the computer, as the second component of the user interface, the received data within data fields of the dynamic tiles associated with the second entry, wherein the dynamic tiles associated with the first entry are different from the dynamic tiles associated with the second entry.

2. The method of claim 1, further comprising identifying, using the at least one computer, a dependency between a first data field and a second data field of the plurality of data fields, wherein the dependency between the first data field and the second data field of the plurality of data fields comprises an indication that a modification to the first data field requires an updating of the second data field.

3. The method of claim 2, wherein the modification comprises a change made to the data in the first data field, wherein the second data field is associated with a second database, wherein after the change the second database is no longer up to date, and the method further comprises: updating, using a computer, the second database based on the dependency and the modification.

4. The method of claim 1, further comprising:
displaying, the at least one computer, a plurality of dynamic tiles based on a user selection of a first entry, wherein a first dynamic tile comprises at least one of the data fields and is associated with a first query;

receiving, using the at least one computer, a user selection of a second entry; and executing, the at least one computer, the first query associated with the first dynamic tile in response to the user selection.

5. The method of claim 4, wherein the execution of the first query is performed without a user input of a query, the method further comprising:

displaying, using the at least one computer, the first dynamic tile with at least one updated data field in response to the execution of the first query, wherein the at least one updated data field is at least partly based on the user selection of the second entry.

6. The method of claim 1, wherein the first data field is associated with the first database and a second data field is associated with a second database, the updating of the second data field results in the querying of the second database based on the modification of the first data field.

7. The method of claim 6, wherein the first database and the second database are independent of each other such that the first database and the second database are associated with different locations and different administrators.

8. A non-transitory computer readable medium carrying one or more instructions to display data, wherein the one or more instructions, when executed by one or more processors, causes the one or more processors to perform the steps of:

displaying, as a first component of a user interface, a selection tile comprising a plurality of entries such that each entry is associated with a data set;

organizing, for each entry, a plurality of dynamic tiles to display data associated with a corresponding data set of an entry, wherein each dynamic tile comprises one or more data fields of the data set;

receiving, a first selection of a first entry displayed in the selection tile;

receiving data associated with the data set for the first entry;

displaying, as a second component of the user interface, the received data into the data fields of the dynamic tiles associated with the first entry;

receiving a second selection of a second entry displayed in the selection tile;

receiving data associated with the data set for the second entry; and displaying, as the second component of the user interface, the received data into data fields of the dynamic tiles associated with the second entry wherein the dynamic tiles associated with the first entry are different from the dynamic tiles associated with the second entry.

9. The non-transitory computer readable medium of claim 8, wherein the steps further comprise identifying a dependency between a first data field and a second data field of the plurality of data fields, wherein the dependency between the first data field and the other data fields second data field of the plurality of data fields comprises an indication that a modification to the first data field requires an updating of the second data field.

10. The non-transitory computer readable medium of claim 9, wherein the modification comprises a change made to the data in the first data field, wherein the second data field is associated with a second database, wherein after the change the second database is no longer up to date, and the steps further comprise: updating the second database based on the dependency and the modification.

11. The non-transitory computer readable medium of claim 8, wherein the steps further comprise:

displaying a plurality of dynamic tiles based on a user selection of a first entry, wherein a first dynamic tile comprises at least one of the data fields and is associated with a first query;

receiving a user selection of a second entry; and executing the first query associated with the first dynamic tile in response to the user selection.

12. The non-transitory computer readable medium of claim 11, wherein the execution of the first query is performed without a user input of a query, the steps further comprise:

displaying the first dynamic tile with at least one updated data field in response to the execution of the first query, wherein the at least one updated data field is at least partly based on the user selection of the second entry.

13. The non-transitory computer readable medium of claim 8, wherein the first data field is associated with the first database and a second data field is associated with a second database, the updating of the second data field results in the querying of the second database based on the modification of the first data field.

14. The non-transitory computer readable medium of claim 13, wherein the first database and the second database are independent of each other such that the first database and the second database are associated with different locations and different administrators.

15. A system to display data, the system comprising: at least one processor and memory, and a non-transitory computer readable medium having thereon one or more programs, which when executed by the at least on processor, cause the system to:

display, as a first component of a user interface, a selection tile comprising a plurality of entries such that each entry is associated with a data set;

organize, for each entry, a plurality of dynamic tiles to display data associated with a corresponding data set of an entry, wherein each dynamic tile comprises one or more data fields of the data set;

receive, a first selection of a first entry displayed in the selection tile;

receive data associated with the data set for the first entry;

display, as a second component of the user interface, the received data into the data fields of the dynamic tiles associated with the first entry;

receive a second selection of a second entry displayed in the selection tile;

receive data associated with the data set for the second entry; and display, as the second component of the user interface, the received data into data fields of the dynamic tiles associated with the second entry, wherein the dynamic tiles associated with the first entry are different from the dynamic tiles associated with the second entry.

16. The system of claim 15, wherein the one or more programs further cause the system to identify a dependency between a first data field and a second data field of the plurality of data fields, wherein the dependency between the first data field and the second data field of the plurality of data fields comprises an indication that a modification to the first data field requires an updating of second data field.

17. The system of claim 16, wherein the modification comprises a change made to the data in the first data field, wherein the second data field is associated with a second database, wherein after the change the second database is no longer up to date, and the one or more programs further cause the system to update the second database based on the dependency and the modification.

18. The system of claim 15, the one or more programs further causing the system to:
- display a plurality of dynamic tiles based on a user selection of a first entry, wherein a first dynamic tile comprises at least one of the data fields and is associated with a first query;
- receive a user selection of a second entry; and
- execute the first query associated with the first dynamic tile in response to the user selection.

19. The system of claim 18, wherein the execution of the first query is performed without a user input of a query, the one or more programs further causing the system to:
- display the first dynamic tile with at least one updated data field in response to the execution of the first query, wherein the at least one updated data field is at least partly based on the user selection of the second entry.

20. The system of claim 15, wherein the first data field is associated with the first database and a second data field is associated with a second database, the updating of the second data field results in the querying of the second database based on the modification of the first data field.

* * * * *